United States Patent
Brunn et al.

(10) Patent No.: US 10,897,446 B2
(45) Date of Patent: Jan. 19, 2021

(54) INITIATING AN ACTION BASED ON A DETERMINED NAVIGATION PATH DATA STRUCTURE

(71) Applicant: International Business Machines Corporation, Armonk, NY (US)

(72) Inventors: Jonathan F. Brunn, Logan, UT (US); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 43 days.

(21) Appl. No.: 15/884,424

(22) Filed: Jan. 31, 2018

(65) Prior Publication Data

US 2018/0183707 A1 Jun. 28, 2018

Related U.S. Application Data

(63) Continuation of application No. 15/195,535, filed on Jun. 28, 2016.

(51) Int. Cl.
*H04L 12/58* (2006.01)
*H04L 29/08* (2006.01)
*H04L 12/725* (2013.01)

(52) U.S. Cl.
CPC ............ *H04L 51/16* (2013.01); *H04L 45/306* (2013.01); *H04L 51/02* (2013.01); *H04L 51/32* (2013.01); *H04L 67/02* (2013.01); *H04L 67/06* (2013.01); *H04L 67/22* (2013.01)

(58) Field of Classification Search
CPC . G06F 21/335; G06F 21/6209; H04L 63/101; H04L 67/10; H04L 69/321
See application file for complete search history.

(56) References Cited

U.S. PATENT DOCUMENTS

| | | | |
|---|---|---|---|
| 7,774,335 B1* | 8/2010 | Scofield | ............ G06F 17/30864 |
| | | | 707/709 |
| 8,838,572 B2 | 9/2014 | Lin et al. | |
| 9,117,240 B2 | 8/2015 | Vaynblat et al. | |
| 9,146,998 B2 | 9/2015 | Vaynblat et al. | |
| 9,147,002 B2 | 9/2015 | Reddy et al. | |
| 9,147,008 B2 | 9/2015 | Griffin | |
| 9,153,000 B2 | 10/2015 | Kazan et al. | |

(Continued)

OTHER PUBLICATIONS

IBM: List of IBM Patents or Patent Applications Treated as Related, 2 pg.

(Continued)

*Primary Examiner* — Philip J Chea
*Assistant Examiner* — Mohammed Ahmed
(74) *Attorney, Agent, or Firm* — Cuenot, Forsythe & Kim, LLC (57) ABSTRACT

A current sharing, in a system by a first user, of first content with at least one other user can be detected. A navigation path data structure indicating at least one navigation path from a second content to the first content within a network environment can be automatically determined. Responsive to determining the navigation path data structure indicating the at least one navigation path from the second content to the first content within the network environment, performance of at least one action can be automatically initiated based on the determined navigation path data structure.

9 Claims, 4 Drawing Sheets

(56) References Cited

U.S. PATENT DOCUMENTS

| | | | | |
|---|---|---|---|---|
| 2010/0005171 | A1* | 1/2010 | Arolovitch | H04L 65/4084 709/225 |
| 2011/0264762 | A1* | 10/2011 | Fu | G06F 17/3087 709/217 |
| 2012/0271719 | A1 | 10/2012 | Straley et al. | |
| 2013/0066975 | A1* | 3/2013 | Kantor | G06F 21/335 709/205 |
| 2013/0117364 | A1 | 5/2013 | Bania et al. | |
| 2013/0159506 | A1* | 6/2013 | Stern | G06F 15/173 709/224 |
| 2014/0046753 | A1* | 2/2014 | Rabii | G06Q 30/0269 705/14.41 |
| 2014/0136528 | A1* | 5/2014 | Anima | G06Q 30/02 707/723 |
| 2014/0229839 | A1* | 8/2014 | Lynch | G06F 9/44505 715/736 |
| 2014/0250390 | A1* | 9/2014 | Holmes | G06F 3/04817 715/760 |
| 2014/0258875 | A1* | 9/2014 | Somerfield | G06F 16/955 715/738 |
| 2014/0279793 | A1 | 9/2014 | Wohlstadter | |
| 2014/0280359 | A1 | 9/2014 | Baecklund et al. | |
| 2014/0324587 | A1 | 10/2014 | Schoen et al. | |
| 2015/0019203 | A1* | 1/2015 | Smith | G06F 17/30796 704/9 |
| 2015/0248222 | A1 | 9/2015 | Stickler et al. | |
| 2015/0286737 | A1* | 10/2015 | Cattone | G06F 3/04842 715/234 |
| 2015/0301703 | A1* | 10/2015 | Steinberg | H04N 21/454 715/753 |
| 2015/0363794 | A1* | 12/2015 | Hoyne | G06Q 30/0201 705/7.29 |
| 2015/0363804 | A1* | 12/2015 | Hoyne | G06Q 30/0206 705/7.35 |
| 2016/0050129 | A1* | 2/2016 | Hoyne | H04L 43/08 709/224 |
| 2016/0253481 | A1* | 9/2016 | Tian | G06F 21/10 726/7 |
| 2017/0286998 | A1* | 10/2017 | Rabii | G06Q 30/0269 |
| 2017/0344197 | A1* | 11/2017 | Kolli | G06F 3/0482 |
| 2017/0364227 | A1* | 12/2017 | Duffield | G06Q 10/00 |
| 2017/0373967 | A1* | 12/2017 | Brunn | H04L 45/308 |
| 2018/0060921 | A1* | 3/2018 | Mengle | G06Q 30/0276 |
| 2018/0124192 | A1* | 5/2018 | Slovak | G06Q 30/0201 |

OTHER PUBLICATIONS

Brunn, J.F. et al., "Initiating an Action Based on a Determined Navigation Path Data Structure," U.S. Appl. No. 15/195,535, filed Jun. 28, 2016, 32 pages (A Copy is not provided as this application is available to the Examiner.

"Cross-domain Tracking," [online] Google Developers, pdated Jan. 25, 2016 [retrieved Feb. 9, 2016], retrieved from the Internet: <https://developers.google.com/analytics/devguides/collection/analyticsjs/cross-domain>, 4 pg.

Verstrepen, M., "Google Analytics Cross Domain Tracking Made Easy," [online] YouMoz, SEOmoz, Inc © 2016, Jan. 19, 2012 [retrieved Jun. 28, 2016], retrieved from the Internet: <https://moz.com/ugc/google-analytics-cross-domain-tracking-made-easy-14596>, 54 pg.

"Tracking Transactions back to the Initial Referrer with Google Analytics," [online] ROI Revolution, Inc. © 2002-2016, May 21, 2009 [retreived Jun. 28, 2016], retrieved from the Internet: <http://www.roirevolution.com/blog/2009/05/tracking_transactions_back_to_the_initial_referrer_with_google_analytics/>, 17 pg.

"Cascade (2011)," [online] The New York Times © 2015, [retrieved Jun. 28, 2016], retrireved from the Internet: <http://nytlabs.com/projects/cascade.html>, 2 pg.

Natarajan, N. et al., "Community Detection in Content-Sharing Social Networks," In Proc. of 2013 IEEE/ACM Intl'l. Conf. on Advances in Social Networks Analysis and Mining, Aug. 25, 2013, pp. 82-89.

"Google Analytics Solutions," [online] Google, Inc. [retrieved Jun. 28, 2016], retrieved from the Internet: <http://www.google.com/analytics/#?modal_active=none>, 11 pg.

Law, R., "Take a Walk Down the Conversion Path With Google Analytics," [online] PPC Hero, Hanapin Marketing LLC © 2007-2015 [retrieved Jun. 28, 2016], retrieved from the Internet: <http://www.ppchero.com/take-a-walk-down-the-conversion-path-with-google-analytics/>, 8 pg.

Sharma, H., "Google Analytics Attribution Modeling—Beginners Guide," [online] OptimizeSmart.com © 2011-2021, [retrieved Jun. 28, 2016], retrieved from the Internet: <https://www.optimizesmart.com/attribution-modeling-google-analytics-ultimate-guide/>, 13 pg.

Wang, S.L. et al., "Anonymizing Multiple K-anonymous Shortest Paths For Social Graphs," In 2011 Second Int'l. Conf. on Innovations in Bio-inspired Computing and Applications (IBICA), Dec. 16, 2011, pp. 195-198.

* cited by examiner

```
┌─────────────────────────────────────────────────┐
│ Detect a current sharing, in a system by a      │
│ first user, of first content with at least one  │
│ other user                                      │
│ 305                                             │
└─────────────────────────────────────────────────┘
                        │
                        ▼
┌─────────────────────────────────────────────────┐
│ Automatically determine a navigation path data  │
│ structure indicating at least one navigation    │
│ path from a second content to the first content │
│ within a network environment                    │
│ 310                                             │
└─────────────────────────────────────────────────┘
                        │
                        ▼
┌─────────────────────────────────────────────────┐
│ Responsive to determining the navigation path   │
│ data structure indicating the at least one      │
│ navigation path from the second content to the  │
│ first content within the network environment,   │
│ automatically initiate, using a processor,      │
│ performance of at least one action based on the │
│ determined navigation path data structure       │
│ 315                                             │
└─────────────────────────────────────────────────┘
```

INITIATING AN ACTION BASED ON A DETERMINED NAVIGATION PATH DATA STRUCTURE

BACKGROUND

The present invention relates to network environments, and more specifically, to sharing of content in a network environment.

Most social networks include a capability for users to share content, as well as links to content, with other users. For example, a user may share a link to content with other users who are friends or contacts of the sharing user. The other users may also share the same link with their friends or contacts. Accordingly, interesting content can be broadly disseminated to a very large number of users, sometimes very quickly (e.g., within hours or days). When content is widely and quickly disseminated in this manner, the content oftentimes is indicated as having gone viral.

SUMMARY

A method includes detecting a current sharing, in a system by a first user, of first content with at least one other user. The method also can include automatically determining a navigation path data structure indicating at least one navigation path from a second content to the first content within a network environment. The method also can include, responsive to determining the navigation path data structure indicating the at least one navigation path from the second content to the first content within the network environment, automatically initiating, using a processor, performance of at least one action based on the determined navigation path data structure.

DETAILED DESCRIPTION

This disclosure relates to network environments, and more specifically, to sharing of content in a network environment.

In accordance with various arrangements described herein, a first user can access content shared by a second user. The first user may navigate from the content to other content, and share the other content with other users. A share tracking system or a client device can determine a navigation path data structure that indicates at least one navigation path from the content to the other content within a network environment. Responsive to determining the navigation path data structure, the share tracking system or client device can automatically initiate performance of at least one action based on the determined navigation path data structure. For example, the share tracking system or client device can automatically indicate in a post, text message, instant message or e-mail via which the other content is shared that the second user contributed to the current sharing of the other content, identify other content, topics or links that correlate to the content, store the navigation path data structure for further analysis, and/or store data indicating techniques by which the navigation path data structure is determined.

Several definitions that apply throughout this document now will be presented.

As defined herein, the term "network environment" means a computing environment in which a plurality of systems and/or devices are communicatively linked via a communication network.

As defined herein, the term "content" means information configured to be presented to one or more users via one or more processing systems (e.g., client devices). Content includes text, audio, one or more images, video, or any combination of text, audio, image(s) and/or video.

As defined herein, the term "content source" means a resource hosted by a processing system in a network environment that provides content. Examples of a "content source" include, but are not limited to, a web page, a web portal, a user forum, a social network, and so on.

As defined herein, the term "navigate" means to proceed from one resource provided in a network environment to at least one other resource provided in the network environment. A resource provided in a network environment can be, for example, a content source.

As defined herein, the term "navigation path" means a series of one or more navigation events that take place in a network environment navigating resources provided in the network environment.

As defined herein, the term "track" means to identify a series of one or more navigation events that take place in a network environment navigating resources provided in the network environment, and store data at least indicating the navigation events to a computer readable storage medium.

As defined herein, the term "navigation path data structure" means a functional data structure in which data at least indicating tracked navigation events is stored in a computer readable storage medium.

As defined herein, the term "share" means at least one user providing to at least one other user content or a link (e.g., a hyperlink, uniform resource identifier or uniform resource locator) to the content.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages. A web based forum can be hosted by a social networking system, but the present arrangements are not limited in this regard.

As defined herein, the term "social networking system" means a system that provides social networking services, for instance via one or more websites. A social networking service is an online service platform on which social networks or social relations are built among people who, for example, share interests, activities, backgrounds or real-life connections, and via which people can share information with one another. As the term "social networking system" is defined herein, a messaging system per se (e.g., an e-mail system, a text messaging system, or an instant messaging system) is not a social networking system, though a social networking system can include an e-mail messaging system, a text messaging system and/or an instant messaging system in addition to one or more social networking components.

As defined herein, the term "post" means to enter a message in a thread of a web based forum. A new thread can be created in which to enter the message, or the message can be entered into an existing thread.

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "server" means a processing system including at least one processor and memory that provides shared services to one or more other systems, including, but not limited to, one or more client devices.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Figure 1:
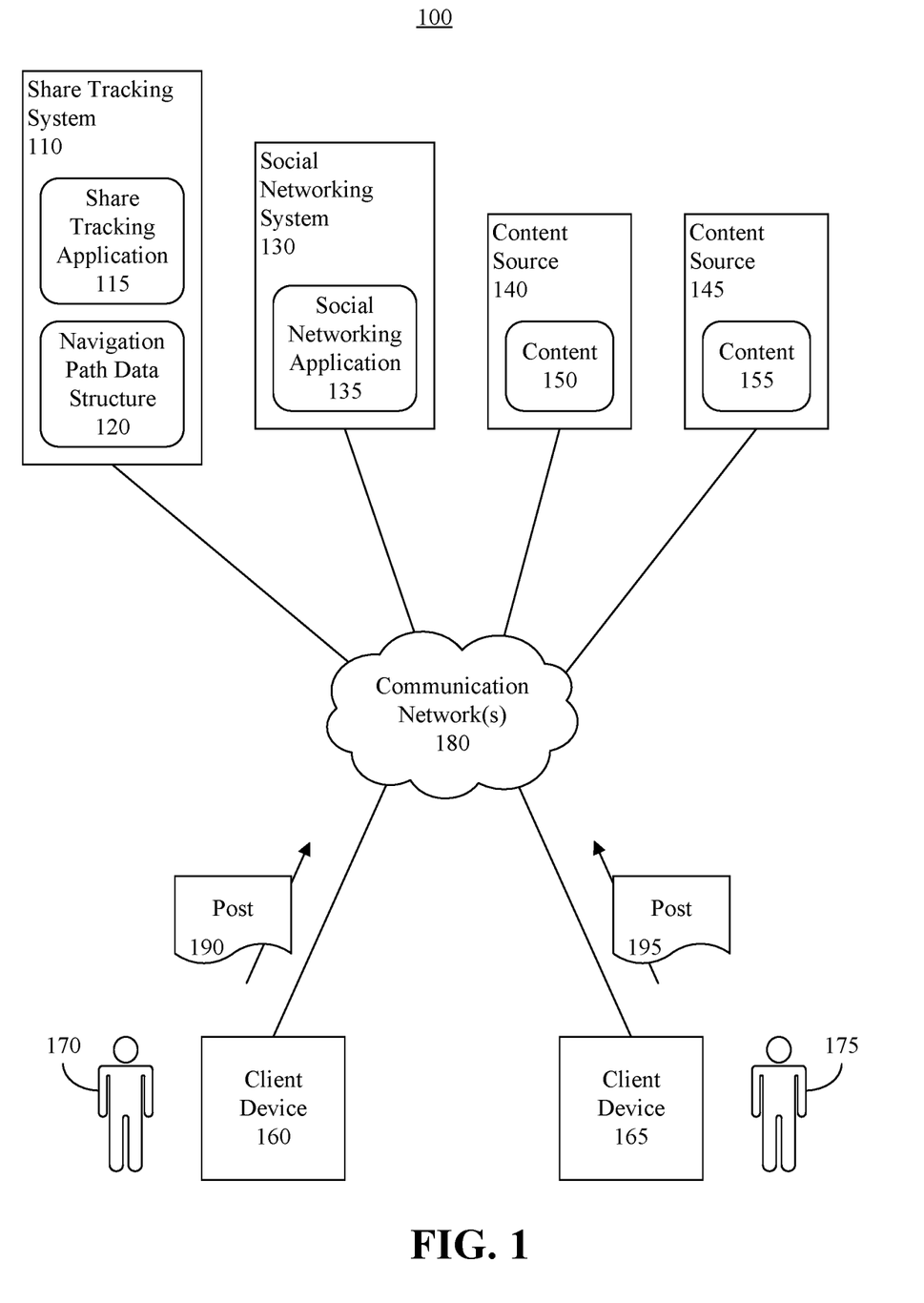
FIG. 1 is a block diagram illustrating an example of a network environment.

FIG. 1 is a block diagram illustrating an example of a network environment (hereinafter "environment") 100. The environment 100 can include a share tracking system 110, a social networking system 130, a plurality of content sources 140, 145 and a plurality of client devices 160, 165. The network environment also can include at least one communication network 180, as well as a variety of other systems and devices (not shown).

The share tracking system 110, social networking system 130, content sources 140, 145, client devices 160, 165 and other systems/devices can be communicatively linked via the at least one communication network 180. The communication network 180 is the medium used to provide communications links between various devices and data processing systems connected together within network data processing system (or computing environment) 100. The communication network 180 may include connections, such as wire, wireless communication links, or fiber optic cables. The communication network 180 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), and/or similar technologies.

The share tracking system 110 can be implemented as at processing system including at least one processor and memory. For example, the share tracking system 110 can be implemented as one or more servers. The share tracking system 110 can execute a share tracking application 115, the operation of which will be described. The share tracking system 110 also can generate and/or update, and store, at least one navigation path data structure 120 indicating at least one navigation path from a first content to another content within the environment 100. The share tracking system 110 can store the navigation path data structure 120 in a computer readable storage medium within the share tracking system 110 or a computer readable storage medium communicatively linked to the share tracking system 110.

The social networking system 130 also can be implemented as at processing system including at least one processor and memory. For example, the social networking system 130 can be implemented as one or more servers. The social networking system 130 can execute a social networking application 135 to provide social networking services to users of the client devices 160, 165.

In one non-limiting arrangement, the share tracking system 110 and social networking system 130 can be implemented using the same processing system (e.g., one or more servers) that execute the share tracking application 115 and the social networking application 135, and store the navigation path data structure 120. Moreover, the share tracking application 115 can be a component of the social networking application 135.

In another non-limiting arrangement, the share tracking system 110 can be the client device 165. For example, the share tracking application 115 can be executed by the client device 165, or can be a component of a web browser or mobile application executed on the client device 165. In illustration, the share tracking application 115 can be a core component of a web browser or mobile application, or can be an extension (e.g., a plugin) for a web browser or mobile application. In such an arrangement, the client device 165 can store the navigation path data structure 120 to a computer readable storage medium in the client device 165 or to a computer readable storage medium communicatively linked to the client device 165.

For simplicity, the following description may describe various operations performed by the share tracking system 110 (e.g., by the share tracking application 115), but it will be understood by those of ordinary skill in the art that such operations may be performed by the social networking system 130 and/or may be performed by the client device 165.

Each content source 140, 145 can be hosted by a processing system (e.g., a server). For example, a particular processing system can host each of the content sources 140, 145, or two or more of the content sources 140, 145 can be hosted on different processing systems. Each content source 140, 145 can provide respective content 150, 155 accessible by the client devices 160, 165.

In operation, a user 170 of the client device 160 can share content 150 provided by the content source 140 with other users, including a user 175 of the client device 165. For example, the user 170 can use a web browser or mobile application executing on the client device 160 to create a post 190 in the social networking system 130 that includes the content 150 and/or a link to the content 150. The user 170 can create the post 190 in an existing social networking thread or the user 170 can start a new social networking thread with the post 190, as is known in the art. In another example, the user 170 can send to one or more users, including the user 175, a text message, an instant message or an e-mail that includes the content 150 and/or a link to the content 150.

In the case that the user 170 shares the content 150 via the social networking system 130, the user 175 can access the post 190 from the social networking system 130, for example using a web browser or mobile application executing on the client device 165. In the case that the user 170 shares the content 150 via a text message, the user 175 can access the text message using a text messaging client executing on the client device 165. In the case that the user 170 shares the content 150 via an instant message, the user 175 can access the instant message using an instant messaging client, a web browser or a mobile application executing on the client device 165. In the case that the user 170 shares the content 150 via an e-mail, the user 175 can access the instant message using an e-mail client, a web browser or a mobile application executing on the client device 165. From the post 190, text message, instant message or e-mail, the user 175 can access the content 150. For example, the user 175 can open the content 150 from the post 190, text message, instant message or e-mail. In another example, the user 175 can select a link to the content 150 from the post 190, text message, instant message or e-mail.

From the content 150, the user 175 may navigate to the content 155. For example, the user 175 can select a link within the content 150 that links to the content 155. In another example, the user 175 can select a link within the content 150 that links to other content, and from the other content the user 175 can select a link to the content 155. Still, the user 175 can follow numerous other links that user 175 follows to navigate to the content 155. In a further example, responsive to accessing the content 150, the user 175 can access an Internet search engine and perform one or more searches using terms contained in the content 150, or other content linked to the content 150. Results of the search(es) can provide links to the content 155 which the user 175 may select to access the content 155. In another example, results of the search(es) can provide links to the other content which the user 175 may select to access the other content, and the other content may provide a link to the content 155. At this point it should be noted that these are mere examples of how the user 175 may arrive at the content 155 after accessing the content 150, but it is anticipated that the user 175 may arrive at the content 155 after accessing the content 150 in any number of ways, and the present arrangements are not limited in this regard.

The user 175 can choose to currently share the content 155 with other users. For example, the user 175 can use a web browser or mobile application executing on the client device 165 to create a post 195 in the social networking application 135 that includes the content 155 and/or a link to the content 155. The user 175 can create the post 195 in an existing social networking thread or the user 175 can start a new social networking thread with the post 195. In the case that the user 175 creates the post 195 in an existing thread, the existing thread may be the thread in which the post 190 is entered, though this need not be the case. In another example, the user 175 can share the content 155 with other users by including the content 155, or a link to the content 155, in a text message, instant message or e-mail.

Responsive to the user currently sharing the content 155 with one or more other users, the share tracking application 115 can automatically determine a navigation path data structure 120 indicating at least one navigation path from the content 150 to the content 155 within the environment 100. Responsive to determining the navigation path data structure 120, the share tracking application 115 can initiate performance of at least one action based on the determined navigation path data structure 120.

In one example, the share tracking application 115 can initiate one or more actions that include identifying the user 170 who provided to the user 175 the content 150 or the link to the content 150. For instance, the share tracking application 115 can identify the user 175 being associated with the content 150 in the navigation path data structure 120. Further, the initiated actions can include automatically indicating in the post 195 (or text message, instant message or e-mail) that the user 170 contributed to the current sharing of the content 155, or presenting, via the client device 165, to the user 175 a message indicating to the user 175 that the user 170 provided the content 150, or the link to the content 150, and suggesting to the user 175 to consider indicating in the post 195 (or text message, instant message or e-mail) that the user 170 contributed to the current sharing of the content 155. Further, the message can provide a user selectable option that, responsive to be selected by the user 175, automatically adds to the post 195 (or text message, instant message or e-mail) information indicating that the user 170 contributed information relating to the post 195 (or text message, instant message or e-mail). For example, the message can present a button that, responsive to being selected by the user, automatically causes the client device 165 to insert into the post 195 (or text message, instant message or e-mail) an indicator indicating that the user 170 contributed information relating to the post 195. The indicator also can include a link and/or citation to the content 150.

Figure 2:
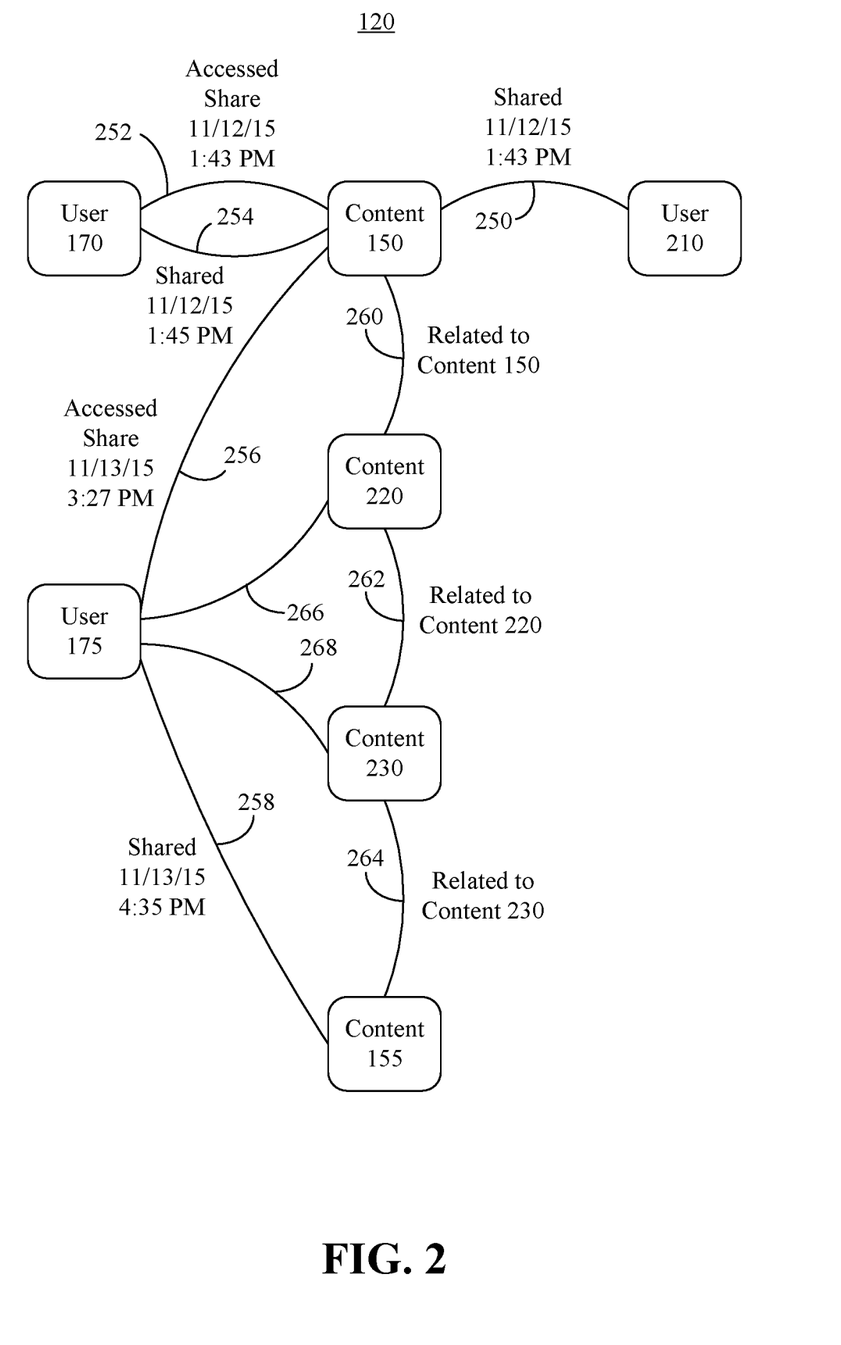
FIG. 2 is a diagram illustrating an example of a navigation path data structure.

In another example, the share tracking application 115 can initiate one or more actions that include identifying various other content, topics and/or links that correlate to one or more of the content 150, 220, 230, 155 indicated in the navigation path data structure 120. Further, the initiated actions can include presenting, via the client device 165, to the user 175 a message indicating the identified content, topics and/or links. The message also can provide a user selectable option that, responsive to be selected by the user 175, automatically adds to the post 195 (or text message, instant message or e-mail) information indicating the identified content and/or topics of interest. The information can include, for example, an indicator including a link and/or citation to the other content.

In a further example, the share tracking application 115 can initiate one or more actions that include storing the navigation path data structure 120 for further analysis and, optionally, storing data indicating techniques by which the navigation path data structure 120 is determined. For example, the share tracking application 115, or another suitable application, can analyze the navigation path data structure 120 to generate data representing the reach and influence of various users 170, 175 within a social network. Further, the share tracking application 115, or another suitable application, can analyze the navigation path data structure 120 to generate data indicating other content 155 discovered pursuant to a user 175 accessing shared content 150, and the way the other content 155 was discovered or may have been discovered. This may occur for new pages or viral content which is being quickly shared and reposted.

FIG. 2 is a diagram illustrating an example of a navigation path data structure 120. The share tracking system 110 can generate and update the navigation path data structure 120 to track relationships between users and content. In this regard, the share tracking application 115 can identify users, content, relationships between users and content, and relationships of various content to one another. For example, the share tracking application 115 can access posts to the social networking system 130, instant messages, text messages and/or e-mails to obtain information related to such communications, including posters/senders of the communications, recipients of the communications and/or with whom the communications are shared, date/time stamps for the communications, content and/or links contained in the communications, and so on. Based the obtained information, the share tracking application 115 can determine the navigation path data structure 120. The navigation path data structure 120 can include a plurality of nodes, including nodes that indicate users 170, 175, 210 and nodes that indicate content 150, 155, 220, 230. The nodes that indicate content 150, 155, 220, 230 can indicate, for example, uniform resource identifiers (URIs), for example uniform resource locators (URLs) to the content. In one arrangement, such nodes can indicate canonical identifiers for respective web pages. In the canonical identifiers, the share tracking application 115 can remove minor differences, such as HTTP vs. HTTPS, or use sort parameters, hashes, and/or other parameters that do not alter the content of the web pages. The share tracking application 115 can normalize URIs using techniques known in the art. In addition, the share tracking application 115 can create edges 250, 252, 254, 256, 258, 260, 262, 264, 268 between nodes indicating relationships between the respective nodes and corresponding date/time stamps.

In illustration, a user 210 can share content 150 with one or more other users, including the user 170. Accordingly, the share tracking application 115 can create a node for the user 210 and a node for the content 150. In addition, the share tracking application 115 can join the respective nodes for the user 210 and the content 150 with an edge 250, and assign to the edge 250 an indicator indicating that user 210 shared the content 150 and a date/time stamp indicating when such sharing took place. Optionally, the share tracking application 115 can create a node for each user with whom the user 210 shares the content 150, or create such node(s) in response to such user(s) accessing the content 150.

The user 170 can access the content 150. If a node for the user 170 does not already exist, the share tracking application 115 can create a node for the user 170. Further, the share tracking application 115 can create an edge 252 between the node for the user 170 and the node for the content 150. The share tracking application 115 can assign to the edge 252 an indicator indicating the user 170 accessed the shared content 150 and a date/time stamp indicating when the user 170 accessed the content 150.

Further, the user 170 can share the content 150 with one or more other users, including the user 175. Accordingly, the share tracking application can create an edge 254 between the node for the user 170 and the node for the content 150. The share tracking application 115 can assign to the edge 254 an indicator indicating the user 170 shared the content 150 and a date/time stamp indicating when the user 170 shared the content 150. Optionally, the share tracking application 115 can create a node for each user with whom the user 170 shares the content 150, or create such node(s) in response to such user(s) accessing the content 150.

The user 175 can access the content 150. Accordingly, the share tracking application 115 can create a node for the user 175. Further, the share tracking application 115 can create an edge 256 between the node for the user 175 and the node for the content 150. The share tracking application 115 can assign to the edge 256 an indicator indicating the user 175 accessed the shared content 150 and a date/time stamp indicating when the user 175 accessed the content 150.

The user 175 can share content 155 with one or more other users. Accordingly, the share tracking application can create a node for the content 155. Further, the share tracking application 115 can create an edge 258 between the node for the user 175 and the node for the content 155. The share tracking application 115 can assign to the edge 258 an indicator indicating the user 175 shared the content 155 and a date/time stamp indicating when the user 175 shared the content 155.

Because the user 175 accessed the content 150 and shared the content 155, the share tracking application 115 can determine whether the content 155 is related to the content 150. Responsive to determining that the content 155 is related to the content 150, the share tracking application 115 can associate the content 155 with the content 155 in the navigation path data structure 120. In this regard, the share tracking application 115 can evaluate the time/date stamps assigned to the edges 256, 258 to determine whether it is likely that the user 175 shared the content 155 in response to accessing the content 150. For example, the share tracking application 115 can determine whether the user 175 shared the content 155 within a predetermined amount of time after accessing the content 150, whether the user 175 accessed other shared content after accessing the content 150 but before accessing the content 155, and so on. If the user 175 shared the content 155 within the predetermined amount of time and did not access other shared content after accessing the content 150 but before accessing the content 155, the share tracking application 115 can infer that sharing of the content 155 by the user 175 was in response to the user 175 accessing the content 150. Further, the share tracking application 115 can assign weighted values to various events initiated by the user 175 between the time the user 175 accessed the content 150 and shared the content 150, and the share tracking application 115 can evaluate such events and weighted values to infer whether sharing of the content 155 by the user 175 was in response to the user 175 accessing the content 150.

In one example, the share tracking application 115 can monitor the user's 175 navigation of the social networking application 135 (e.g., other posts in the social networking application 135) and content sources 140, 145 to identify the navigation path used by the user 175 to arrive at the content 155. For instance, the share tracking application 115 can identify navigation events performed by the user 175. Based on the identified navigation events, the share tracking application 115 can identify the content involved in the navigation events and associate the content with the user 175.

In illustration, as the user 175 initiates various events (e.g., selects links, performs searches, etc.) to navigate to the content 155, the share tracking application 115 can track the navigation path used by the user 175 to proceed from the content 150 to arrive at the content 155. In one arrangement, a web browser or mobile application executing on the client device 165 used by the user 175 can include a tracking cookie or script that tracks navigation events initiated by the user and communicates corresponding data to the share tracking application 115. In another arrangement, single pixel logging can be embedded in content, including the content 150, 155. The corresponding content sources 140, 145 can be configured to communicate to the share tracking application 115 data indicating content 150, 155 that is accessed, who accessed the content 150, 155 (e.g., the users 170, 175), and when the content 150, 155 is accessed (e.g., time/date stamps). Single pixel logging is known in the art.

If the user 175 navigates from the content 150 to the content 220, then to the content 230, and then to the content 155, the share tracking application 115 can create respective nodes for the content 220 and content 230, and create edges 260, 262, 264 indicating such navigation path. Further, the share tracking application 115 can assign to the edge 260 an indicator indicating that the content 220 is related to the content 150, assign to the edge 262 an indicator indicating that the content 230 is related to the content 220, and assign to the edge 264 an indicator indicating that the content 155 is related to the content 230.

Further, the share tracking application 115 can associate the content 220, 230 with the user 175 by assigning respective edges 266, 268 between the node representing the user 175 and the respective nodes representing the content 220, 230. The share tracking application 115 can also can assign to the edges 266, 268 indicators (not shown) indicating date/time stamps when the user 175 accessed the respective content 220, 230.

In some cases, the various navigation events initiated by the user 175 to navigate to the content 155 may not form a direct navigation path. For example, the user 175 may access other content unrelated to the content 150 and the content 155 prior to arriving at the content 155. Moreover, in some cases the share tracking application 115 may not receive each of the user's navigation events, for example in an arrangement in which the share tracking application 115 does not execute on the client device 165. Notwithstanding, the share tracking application 115 can automatically discover content associations associating the content 155 with the content 150, and use the discovered content associations to infer the direct navigation path. For example, the share tracking application 115 can perform search crawling (e.g., using a web crawler and/or one or more application program interfaces (APIs)) to discover content associations associating the content 155 with the content 150. The discovered content associations can indicate a likely navigation path used by the user 175 to arrive at the content 155 from the content 150 through accesses to related content.

In illustration, the share tracking application 115 can automatically discover a series of content associations leading from the content 150 to the content 155. For example, the share tracking application 115 can discover that the content 155 is related to the content 230, the content 230 is related to the content 220, and the content 220 is related to the content 150. The share tracking application 115 can make such discoveries by identifying one or more links (e.g., hyperlinks), information (e.g., terms, phrases and/or other information) in common, or make such discoveries in another other suitable manner. Thus, one or more likely navigation paths from the content 150 to the content 155 can be identified. Nonetheless, the share tracking application 115 can emphasize breadth in the implemented discovery routine, and analyze a plurality of potential paths to identify shorter paths the user 175 may have taken from the content 150 to the content 155. The share tracking application 115, however, can give priority to those navigation paths that include content 220, 230 the user 175 may actually have accessed. If the content 220, 230 was not available to be accessed prior to the user 175 sharing the content 155, then the navigation path that includes the content 220, 230 can be disregarded.

In the case that the user did not access the content 220, 230, or the share tracking application 115 is unaware of whether the user accessed the content 220, 230, but the content 220, 230 is included in an identified navigation path from the content 150 to the content 155, the share tracking application 115 can identify the content 220, 230 as being of interest to the user 175. Accordingly, the share tracking application 115 can indicate to the user 175 that the content 220, 230 a topic that is of interest to the user, for example by presenting a message to the user 175, as previously described, which includes links to the content 220, 230.

To determine whether various content 150, 220, 230, 155 have terms, phrases and/or other information in common, the share tracking application 115 can implement natural language (NLP) and semantic analysis on terms, phrases and/or other information contained in the content 150, 220, 230, 155. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the share tracking application 115 to implement NLP and semantic analysis.

In another arrangement, the share tracking application 115 also can identify historical information indicating frequent pairs of navigation and content sharing events, and determine a navigation path based on such historical information. For instance if a plurality of other users have selected a particular link to access other content (e.g., content other than the content 150, 155), and subsequently share the content 155, the share tracking application 115 or another application can store data indicating a relationship between the other content and the content 155. Thus, responsive to the user 175 sharing the content 155, the share tracking application 115 can access and process the data to include in the navigation path data structure 120, in the navigation path between the content 150 and the content 155, a node representing the other content. In addition, responsive to the user 175 sharing the content 155, the share tracking application 115 can provide to the user 175 a link to the other content and indicate to the user 175 that the user may be interested in the content that is available via the link.

At this point it should be noted that the navigation path data structure 120 is one example of a navigation path data structure that the share tracking application 115 can generate, but numerous other examples are within the scope of the present arrangements. In another example navigation path data structure 120, the share tracking application 115 can include a social graph representing social connections among users in the social networking system 130, and supplement the social graph with content associations from outside the social networking system 130. For instance, the share tracking application 115 can supplement the social graph with the nodes representing the content 150, 220, 230, 155 and the edges 250-268 in a manner similar that previously described. In yet another example, the share tracking application 115 can access a sitemap of all potential navigation paths between the content 150, 155 within a domain, and process the sitemap to determine one or more navigation paths from the content 150 to the content 155.

Figure 3:
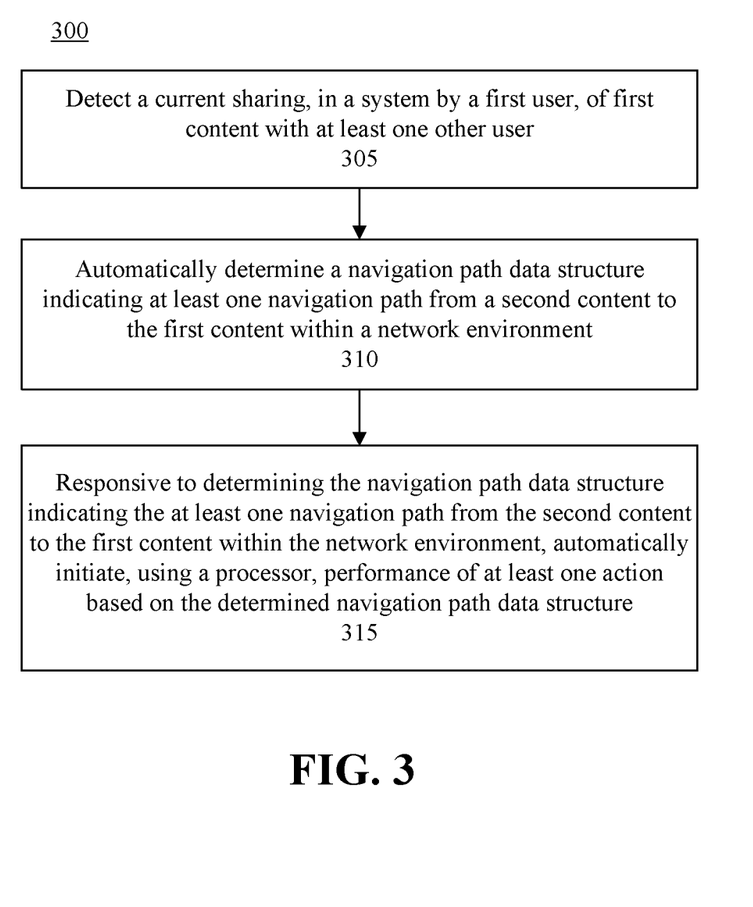
FIG. 3 is a diagram illustrating an example of a method of initiating performance of at least one action based on a determined navigation path data structure.

FIG. 3 is a diagram illustrating an example of a method 300 of initiating performance of at least one action based on the determined navigation path data structure. At step 305, the share tracking application can detect a current sharing, in a system by a first user, of first content with at least one other user. At step 310, the share tracking application 115 can automatically determine a navigation path data structure indicating at least one navigation path from a second content to the first content within a network environment. At step 315, the share tracking application 115 can, responsive to determining the navigation path data structure indicating the at least one navigation path from the second content to the first content within the network environment, automatically initiate, using a processor, performance of at least one action based on the determined navigation path data structure.

Figure 4:
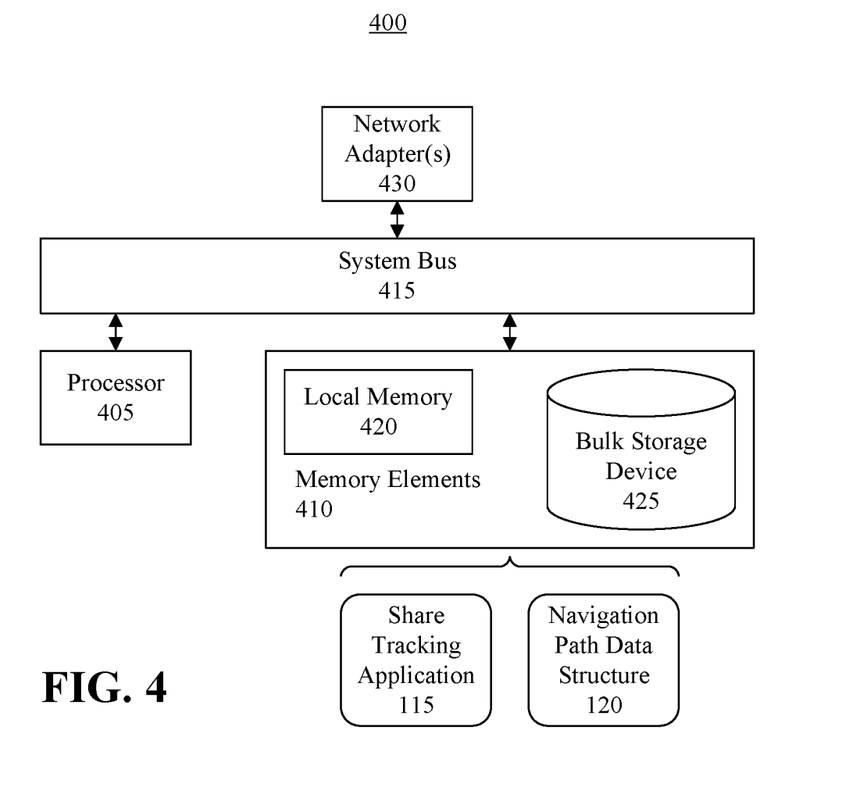
FIG. 4 is a block diagram illustrating example architecture for a data processing system.

FIG. 4 is a block diagram illustrating example architecture for a data processing system 400. In an arrangement in which the share tracking application 115 is executed by the share tracking system 110 of FIG. 1, the data processing system 400 can represent an example architecture for the share tracking system 110. In an arrangement in which the share tracking application 115 is executed by the client device 165 of FIG. 1, the data processing system 400 can represent an example architecture for the client device 165.

The data processing system 400 can include at least one processor 405 (e.g., a central processing unit) coupled to memory elements 410 through a system bus 415 or other suitable circuitry. As such, the data processing system 400 can store program code within the memory elements 410. The processor 405 can execute the program code accessed from the memory elements 410 via the system bus 415. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the bulk storage device 425 during execution.

One or more network adapters 430 can be coupled to the data processing system 400 either directly or through intervening input/output (I/O) controllers. The network adapter(s) 430 can enable the data processing system 400 to become coupled to other systems, computer systems, remote printers, and/or remote storage devices through intervening private or public networks. Modems, cable modems, transceivers, and Ethernet cards are examples of different types of network adapters 430 that can be used with the data processing system 400. Other components (not shown) also can be coupled to the data processing system 400. For example, in an arrangement in which the data processing system 400 represents example architecture for the client device 165, one or more displays, pointing devices, keyboards, etc. can be coupled to the processing system via suitable I/O controllers.

As pictured in FIG. 4, the memory elements 410 can store the share tracking application 115 and the navigation path data structure 120. Being implemented in the form of executable program code, the share tracking application 115 can be executed by the data processing system 400. The navigation path data structure 120 can be determined by, and processed by, the data processing system 400. Accordingly, the share tracking application 115 and the navigation path data structure 120 can be considered part of the data processing system 400. Moreover, the share tracking application 115 and the navigation path data structure 120 are functional data structures that impart functionality when employed as part of the data processing system 400.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  detecting a current sharing, in a system by a first user, of first content with at least a second user;
  detecting the second user accessing the first content, accessing a second content and sharing the second content;
  responsive to detecting the second user accessing the first content and, after the second user accessing the first content, the second user accessing the second content and sharing the second content, determining whether the second content is related to the first content;
  responsive to determining that the second content is related to the first content, automatically determining a navigation path data structure indicating at least one navigation path from the first content to the second content via at least a third content within a network environment; and
  responsive to determining the navigation path data structure indicating the at least one navigation path from the first content to the second content via at least the third content within the network environment, automatically initiating, using a processor, performance of at least one action based on the determined navigation path data structure.

2. The method of claim 1, wherein automatically determining the navigation path data structure indicating the at least one navigation path from the first content to the second content via at least the third content within the network environment comprises:
  identifying at least one monitored event initiated by the second user to navigate to the second content from the first content via at least the third content.

3. The method of claim 1, wherein:
  determining whether the second content is related to the first content comprises automatically discovering at least one content association between the first content and the second content; and
  automatically determining the navigation path data structure indicating the at least one navigation path from the first content to the second content via at least the third content within the network environment comprises inferring the navigation path by processing the at least one discovered content association.

4. The method of claim 1, wherein:
  determining whether the second content is related to the first content comprises automatically discovering a series of content associations leading from the first content to the second content via at least the third content; and
  automatically determining the navigation path data structure indicating the at least one navigation path from the first content to the second content via at least the third content within the network environment comprises inferring the navigation path by processing the discovered series of content associations.

5. The method of claim 4, wherein automatically discovering the series of content associations leading from the first content to the second content via at least the third content comprises:
  discovering content associations among the first content, the second content and at least the third content by identifying, using search crawling, links between the first content, the second content and at least the third content or identifying information in common among the first content, the second content and at least the third content.

6. The method of claim 4, wherein automatically discovering the series of content associations leading from the first content to the second content via at least the third content comprises:
  identifying historical information indicating frequent pairs of navigation and content sharing events; and
  processing the historical information.

7. The method of claim 1, wherein initiating performance of at least one action based on the determined navigation path data structure comprises automatically indicating in a post, text message, instant message or e-mail via which the first content is shared by the second user that the first user contributed to the current sharing of the first content.

8. The method of claim 1, wherein initiating performance of at least one action based on the determined navigation path data structure comprises storing the navigation path data structure for further analysis.

9. The method of claim 1, wherein initiating performance of at least one action based on the determined navigation path data structure comprises storing data indicating techniques by which the navigation path data structure is determined.

* * * * *